United States Patent Office 3,107,246
Patented Oct. 15, 1963

3,107,246
PROCESS FOR THE PREPARATION OF PHOSPHORIC ACID ESTERS
John F. Ferguson, Mobile, Ala., assignor to Geigy Chemical Corporation, Greenburgh, N.Y., a corporation of Delaware
No Drawing. Filed July 5, 1962, Ser. No. 207,785
6 Claims. (Cl. 260—251)

This invention relates to an improved process of preparing esters of phosphoric acid, and more specifically to phosphoric esters of substituted hydroxypyrimidines of the following general formula:

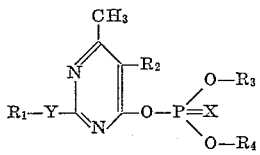

(I)

wherein $R_1$ represents alkyl, alkenyl, alkoxyalkyl or alkylmercaptoalkyl radicals,
$R_2$ stands for hydrogen, lower alkyl or lower alkenyl radicals,
$R_3$ and $R_4$ are lower alkyl radicals,
X represents oxygen or sulfur, and
Y consists of the direct link or sulfur.

These compounds which are disclosed and claimed in U.S. Patent 2,754,243, and particularly the dialkoxy thiophosphates, as for example, O,O-diethyl-O-(2-isopropyl-4-methyl-6-pyrimidyl)thiophosphate, are of great commercial value by virtue of their well-established insecticidal and acaricidal activity and consequent usefulness in pest control.

The compounds of the above formula have heretofore been produced by reacting an aliphatic phosphoric acid diester halide or thiophosphoric acid diester halide of the formula:

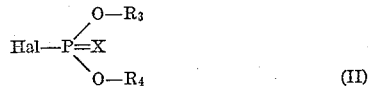

(II)

wherein Hal represents chlorine or brimine and X, $R_3$ and $R_4$ are as defined hereinabove, with a hydroxypyrimidine of the formula:

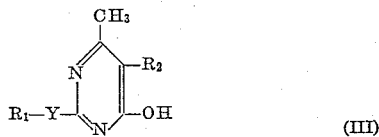

(III)

wherein $R_1$, $R_2$ and Y have the significance given to them above, in the presence of benzene as solvent and potassium carbonate as acid binding agent.

However, the practice of this process entailed certain drawbacks and disadvantages. Thus, for example, it was not possible to use as acid binding agent, in lieu of potash, soda ash which is appreciably less expensive, i.e. only 15–25% of the cost of potash, inasmuch as with soda ash yields of less than 20% are obtainable even if the reaction time is in excess of 24 hours. But even with potash being used, the total reaction time was too long from the point of view of commercial feasability, e.g., in excess of 16 hours.

It has now been found and forms the principal object of this invention, that dialkoxy thiophosphates of Formula I of great purity and in high yields may be advantageously produced in a considerably shortened period of time by means of a procedure which utilizes cupric chloride as catalyst.

While it is known that in the production of phosphoric acid esters, and especially, thiophosphoric acid esters of phenols, copper catalysts, especially, cuprous chloride, may be utilized, it has, however, heretofore been believed that cupric salts, e.g. cupric chloride, are not satisfactory (U.S. Patent No. 2,784,207).

In contrast thereto, the present invention resides in the very discovery that cupric chloride exhibits unexpectedly excellent catalytic activity when used in the manufacture of compounds of Formula I. It has also been surprisingly found that other halogen salts of copper, such as the copper iodides and bromides, as well as copper as such, possess no utility or only limited utility in the process for preparation of dialkoxy thiophosphates of the above formula and that the yields with cupric chloride are as high or higher than those obtainable with cuprous chloride. In a series of four experiments using 0.0075 mole of catalyst to one mole of ester chloride, it was found that while the yields with cuprous chloride were all below 90%, i.e. about 87.5% the yields with cupric chloride were considerably above 90%, i.e. about 92.5% after reaction times of four, five, six and seven hours.

In the subject process a hydroxypyrimidine of the Formula III and sodium carbonate are refluxed in benzene for about 3 to 5 hours to remove water azeotropically. Then the suspension is cooled to about 70° C. and the desired dialkyl phosphoric or, preferably, thiophosphoric acid halide of the Formula II, in a substantially equimolar amount to that of the hydroxypyrimidine of Formula III, is added thereto together with a catalytic amount of cupric chloride and the mixture is refluxed for approximately four to seven hours. In the product workup, the material is washed and the benzene is removed by vacuum distillation.

The final products obtained according to the inventive process are exceptionally good in color.

It has been found that it is practicable to employ amounts ranging from 0.001 to 0.1 mole of catalyst per mole of O,O-dialkyl thiophosphoric acid chloride. Although it is possible to use amounts beyond this range, a decrease in quantity of catalyst below the indicated minimum results in an increase in reaction time and a decrease in yield; an increase in amount of catalyst above the indicated maximum has no adverse effects, it is true, but yields no advantage. A preferred range, however, is 0.0025 to 0.0150 mole of catalyst per mole of the ester chloride; a still more preferred range is 0.0075 to 0.01.

It is possible to use in this inventive process instead of benzene as inert solvent also such other diluents or slurrying agents as toluene, xylene, chlorobenzene, and similar aromatic hydrocarbons. However, this list of usable solvents is not exclusive. It has been found that aliphatic hydrocarbons, both cyclic and non-cyclic, can also be employed. In fact, any solvent or inert diluent can be used in the practice of this process as long as it forms an azeotrope with water so that the water formed during the reaction can be removed. Also mixtures of any of the thus practicable solvents can be employed. For instance, Tolusol (trademark of Shell), which consists of 31% of paraffins, 55% of naphthenes, 13% of aromatics and 1% of olefins, has been successfully used.

In lieu of soda ash, which is the preferred anhydrous acid binding agent, other materials such as potassium carbonate, calcium carbonate, sodium hydroxide and their equivalents may be employed.

The invention may be illustrated in greater detail by the following examples; it is, however, not limited thereto.

*Example 1*

2-isopropyl - 4 - methyl - 6 - hydroxypyrimidine (223 g. 100%, 1.47 moles) and 163 g. of sodium carbonate (1.38 moles finely divided light grade) were charged together with 460 g. of benzene into a liter, round-bottom, three-neck flask equipped with a heating mantle, agitator, thermometer and water cooled reflux condenser fitted with a Barrett-type water trap. This mixture was refluxed for five hours to azeotropically remove water in the Barrett separator. Then the suspension was cooled to 70° C. and .56 g. (.00328 mole) of cupric chloride dihydrate as well as 247 g. (1.31 moles) of O,O-diethyl chlorothiophosphate—ratio of 0.0025 mole of CuCl₂ per one mole of ester chloride—was added and the whole reaction mixture refluxed for seven hours at atmospheric pressure. The solution was then cooled, washed with water, twice with 3% sodium hydroxide and with 5% sulfuric acid and again twice with water, and the benzene was removed by vacuum distillation so that the temperature did not exceed 95° C. The desired reaction product, O,O-diethyl-O-(2-isopropyl-4-methyl-6-pyrimidyl)thiophosphate, was then analyzed by the "sulfuric acid extraction method" (i.e. the procedure set forth in "Specifications for Pesticides," World Health Organization, 1956, p. 85, but modified in that the first extraction with distilled water is carried out with one portion of 50 ml. of distilled water and is preceded by extraction with three portions of 50 ml. 3 N sulfuric acid). Yield: 356 g. (72.6% of theory).

*Example 2*

Example 1 was repeated except that .0066 mole of cupric chloride dihydrate was used—ratio of 0.005 mole of CuCl₂ per one mole of ester chloride. Yield: 84.9% of theory.

*Example 3*

Example 1 was repeated except that .0099 mole of cupric chloride dihydrate was used—ratio of 0.0075 mole of CuCl₂ per one mole of ester chloride. Yield: 90.3% of theory. In other experiments employing the same amount of catalyst yields of 92% and 92.7% were achieved.

*Example 4*

Example 1 was repeated except that .020 mole of cupric chloride dihydrate was used—ratio of 0.015 mole of CuCl₂ per one mole of ester chloride. Yield: 88.6% of theory.

What is claimed is:

1. In a process for the production of O,O-dialkyl-O-aryl phosphates and thiophosphates by reacting a dialkyl phosphoric acid halide of the formula:

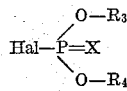

wherein

Hal is selected from the group consisting of chlorine and bromine,

X is taken from the group consisting of oxygen and sulfur, and

R₃ and R₄ are lower alkyl, with a hydroxy pyrimidine of the formula:

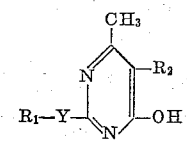

wherein

R₁ is selected from the group consisting of alkyl, alkenyl, alkoxyalkyl and alkylmercaptoalkyl, R₂ is a member of the group consisting of hydrogen, lower alkyl and lower alkenyl, and Y is taken from the group consisting of sulfur and the direct link, in a hydrocarbon diluent and in the presence of an acid binding agent, the improvement which consists in refluxing said reactants in the presence of cupric chloride as catalyst.

2. A process according to claim 1 wherein 0.001 to 0.1 mole of cupric chloride is present per mole of the said dialkyl phosphoric acid halide.

3. A process according to claim 1 wherein 0.0025 to 0.0150 mole of cupric chloride is present per mole of the said dialkyl phosphoric acid halide.

4. In a process for preparing O,O-diethyl-O-(2-isopropyl-4-methyl-6-pyrimidyl)thiophosphate of high yield and purity by reacting substantially equimolar quantities of 2-isopropyl-4-methyl-6-hydroxypyrimidine and O,O-diethyl chlorothiophosphate, suspended in a hydrocarbon diluent and in the presence of an anhydrous acid binding agent, the improvement which consists in refluxing said reactants in the presence of 0.001 to 0.1 mole of cupric chloride per mole of O,O-diethyl chlorothiophosphate.

5. A process according to claim 4, wherein 0.0025 to 0.015 mole of cupric chloride is present per mole of O,O-diethyl chlorothiophosphate.

6. A process for preparing O,O-diethyl-O-(2-isopropyl-4-methyl-6-pyrimidyl)thiophosphate of high yield and purity by reacting substantially equimolar quantities of 2-isopropyl-4-methyl-6-hydroxypyrimidine and O,O-diethyl chlorothiophosphate suspended in an aromatic hydrocarbon diluent and in the presence of an anhydrous acid binding agent, the improvement which consists in refluxing said reactants in the presence of 0.0075 to 0.01 mole of cupric chloride per mole of O,O-diethyl chlorothiophosphate.

References Cited in the file of this patent

UNITED STATES PATENTS 2,784,207     Geoghegan et al. _____ Mar. 5, 1957